(12) United States Patent
Rastogi

(10) Patent No.: US 8,887,163 B2
(45) Date of Patent: Nov. 11, 2014

(54) TASK SCHEDULING BASED ON DEPENDENCIES AND RESOURCES

(75) Inventor: Perv Rastogi, San Jose, CA (US)

(73) Assignee: eBay Inc., San Jose, CA (US)

( * ) Notice: Subject to any disclaimer, the term of this patent is extended or adjusted under 35 U.S.C. 154(b) by 224 days.

(21) Appl. No.: 13/166,395

(22) Filed: Jun. 22, 2011

(65) Prior Publication Data

US 2011/0321051 A1 Dec. 29, 2011

Related U.S. Application Data

(60) Provisional application No. 61/358,837, filed on Jun. 25, 2010.

(51) Int. Cl.
  *G06F 9/46* (2006.01)
  *G06F 9/48* (2006.01)
  *H04L 29/08* (2006.01)
  *G06F 9/50* (2006.01)

(52) U.S. Cl.
  CPC ........ *G06F 9/4881* (2013.01); *H04L 29/08963* (2013.01); *G06F 9/5038* (2013.01)
  USPC ............................ 718/102; 718/103; 718/106

(58) Field of Classification Search
  CPC ................ G06F 9/5038; G06F 9/4881; H04L 29/08963
  See application file for complete search history.

(56) References Cited

U.S. PATENT DOCUMENTS

| | | | |
|---|---|---|---|
| 5,408,663 A * | 4/1995 | Miller | 718/104 |
| 6,430,593 B1 * | 8/2002 | Lindsley | 718/103 |
| 7,372,857 B1 * | 5/2008 | Kappler et al. | 370/395.4 |
| 7,930,699 B2 * | 4/2011 | Santos-Gomez | 718/101 |
| 2005/0134893 A1 * | 6/2005 | Han | 358/1.14 |
| 2006/0265690 A1 * | 11/2006 | Motoyama et al. | 717/117 |

* cited by examiner

*Primary Examiner* — Camquy Truong
(74) *Attorney, Agent, or Firm* — Schwegman Lundberg & Woessner, P.A.

(57) ABSTRACT

An example system identifies a set of tasks as being designated for execution, and the set of tasks includes a first task and a second task. The example system accesses task dependency data that corresponds to the second task and indicates that the first task is to be executed prior to the second task. The example system, based on the task dependency data, generates a task dependency model of the set of tasks. The dependency model indicates that the first task is to be executed prior to the second task. The example system schedules an execution of the first task, which is scheduled to use a particular data processing resource. The scheduling is based on the dependency model.

20 Claims, 12 Drawing Sheets

US 8,887,163 B2

TASK SCHEDULING BASED ON DEPENDENCIES AND RESOURCES

RELATED APPLICATIONS

This application claims the priority benefit of U.S. Provisional Application No. 61/358,837, filed Jun. 25, 2010, and entitled, "Task Scheduling Based on Dependencies and Resources," the contents of which are incorporated herein by reference in their entirety.

TECHNICAL FIELD

The subject matter disclosed herein generally relates to the processing of data. Specifically, the present disclosure addresses systems and methods of task scheduling.

BACKGROUND

In data processing technology, software may include instructions to perform various tasks. As used herein, a "task" is a unit of work that may be scheduled for execution, either independently of other tasks or dependent upon one or more other tasks. Performance of a particular task may involve the use of a data processing resource. As used herein, a "data processing resource" is a tangible or intangible entity able to facilitate execution of the task. A data processing resource may include hardware (e.g., a processor, a memory location, or a peripheral device), software (e.g., a socket, a port, a device driver, or a network connection), or any suitable combination thereof.

BRIEF DESCRIPTION OF THE DRAWINGS

Some embodiments are illustrated by way of example and not limitation in the figures of the accompanying drawings in which.

DETAILED DESCRIPTION

Figure 1:
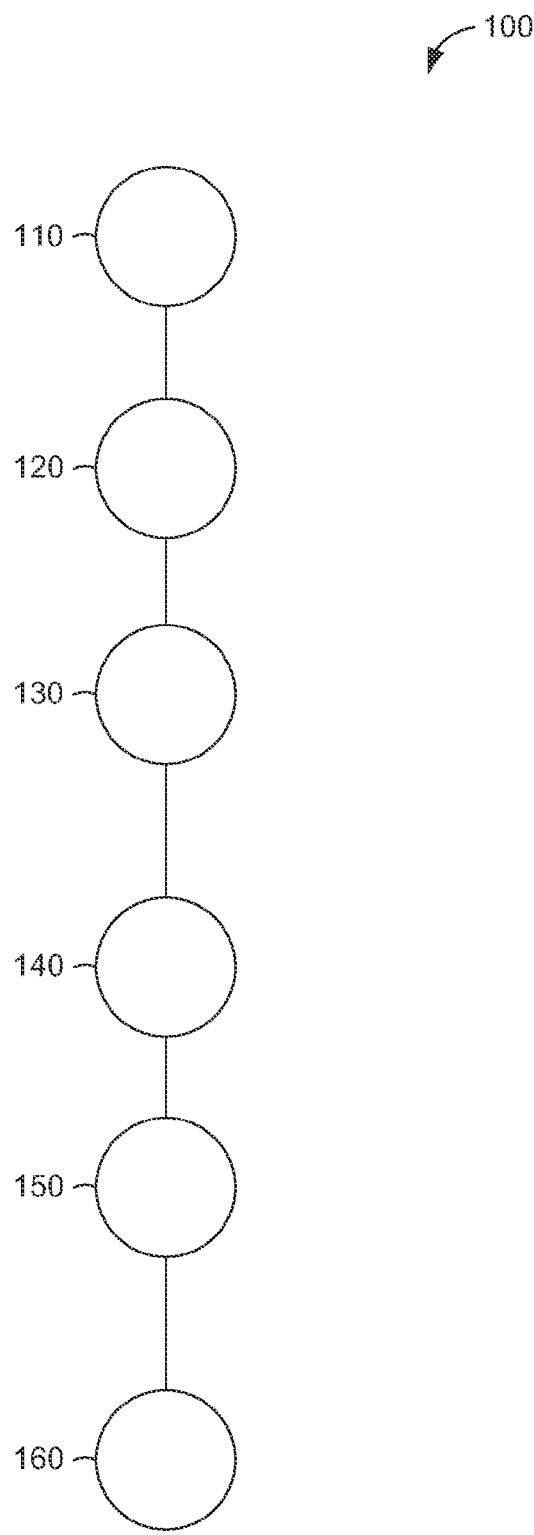
FIG. 1 is a diagram illustrating an example of an execution schedule for a set of tasks, according to some example embodiments.

Example methods and systems are directed to task scheduling based on one or more dependencies and one or more resources. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

An example task scheduling system is referred to herein as "DGTaskExecutor" Or "Directed Graph TaskExecutor." The example system is configured to perform one or more of the example methods discussed herein.

DGTaskExecutor may facilitate a determining of a set of tasks that can execute concurrently, management of one or more task priorities (e.g., scheduled execution times), management of one or more constraints on a data processing resource, or any suitable combination thereof. Figuratively, DGTaskExecutor may orchestrate how and when tasks will execute, for example, by dynamically assigning task priorities and utilizing (e.g., applying) resource constraints.

A software application (e.g., a web application) may entail one or more requests for execution of a set of tasks. In various example embodiments, execution of the software application causes the set of tasks to be requested for execution, designated as in need of execution, prescribed for execution, marked for execution, or otherwise identified as designated for execution. In some situations, two or more tasks within the set of tasks may be executable concurrently (e.g., in a multi-threaded implementation of the software application). In various situations, the set of tasks may include one or more individual tasks that, directly or indirectly, depend on another task. For example, a particular task may be unable to execute until another task has completed execution. As another example, a task may be unable to execute until another task has initiated execution, but may be executable any time thereafter.

DGTaskExecutor determines a priority of the task. For example, this determination may include inferring the priority of the task, scheduling the task for execution, or any suitable combination thereof. This determination may be based on one or more explicit or implicit constraints on a data processing resource to be utilized in executing the task. DGTaskExecutor therefore may facilitate concurrent execution of independent tasks using independent data processing resources. Moreover, a particular task may correspond to a particular set of constraints applicable to one or more data processing resources. Accordingly, DGTaskExecutor may dynamically adjust one or more task priorities (e.g., task schedules) as tasks are being executed, completing execution, or any suitable combination thereof. In some example embodiments, one or more constraints processed by DGTaskExecutor may be overridden (e.g., by custom data, user input, or data from the software application).

In facilitating the concurrent execution of two or more tasks, DGTaskExecutor enables a multi-threaded implementation of the software application. DGTaskExecutor allows the set of tasks (e.g., data defining the set) or a particular task (e.g., data defining the task) to configure a number of threads (e.g., additional threads beyond one thread) that will be used to process the set of tasks. According to some example embodiments, the set of tasks corresponds to work that may be performed by a server in processing a request for information identified by a network-based locator (e.g., a uniform resource locator (URL)). The set of tasks may correspond to a document to be provided (e.g., generated and communicated) in response to a request for the document. For example, a user may use a machine to access a URL, and a web server that serves the URL may respond by generating a document and providing the document to the machine (e.g., via a network). The generation of the document may involve (e.g., designate, request, prescribe, or mark) executing the set of tasks, that, when executed, obtain information that is usable to generate at least a portion of the document (e.g., one portion, multiple portions, or the entirety of the document).

DGTaskExecutor identifies a set of tasks as being designated for (e.g., requested for, prescribed for, marked for, or in need of) execution. For illustrative purposes, consider the set of tasks as including at least a first task and a second task (e.g., first and second tasks). DGTaskExecutor accesses task dependency data of the second task. The task dependency data may be accessed from a cache (e.g., to avoid runtime costs). The task dependency data of the second task corresponds to the second task and indicates that the first task is to be executed prior to the second task. DGTaskExecutor generates a dependency model (e.g., dependency model data) based on the task dependency data. The dependency model may be visualized as a graph or map depicting the tasks and the dependencies among the tasks. In particular, the dependency model indicates that the first task is to be executed prior to the second task. DGTaskExecutor then schedules an execution of the first task using a data processing resource. The scheduling of the execution is based on the dependency model (e.g., the dependency model data), and the execution of the first task is scheduled to occur prior to an execution of the second task. A dependency model may also be known as a "task graph" (e.g., a graph, diagram, or chart that illustrates dependencies among tasks).

DGTaskExecutor allows the user to dynamically change the execution pattern of an application by granting or removing access to data processing resources (e.g., processing threads) at runtime by modifying data processing resource profiles (e.g., a thread profile). A task graph may be generated at runtime. Accordingly, a task graph may represent a current "version" of the software application (e.g., application code), and as the software application changes over time, the task graph also changes. Generation of the task graph at runtime may have the effect of allowing DGTaskExecutor to dynamically optimize an execution plan for the set of tasks (e.g., as opposed to having a developer periodically optimize the execution plan manually).

FIG. 1 is a diagram illustrating an example of an execution schedule for a set 100 of tasks 110, 120, 130, 140, 150, and 160. The set 100 corresponds to a software application. For example, execution (e.g., invocation or initiation) of the software application may designate the set 100 for execution.

In the example shown, the tasks 110-160 are scheduled for sequential execution (e.g., one task at a time, one after the other). This is a single-threaded implementation of the set 100. As shown, execution of the task 110 is to occur prior to execution of the task 120, which is to occur prior to execution of the task 130. Similarly, execution of the task 130 is to occur prior to execution of the task 140, which is to occur prior to execution of the task 150, which in turn is to occur prior to execution of the task 160.

Some of the tasks 130, 150, and 160 may be significant tasks (e.g., primary tasks, critical tasks, or mandatory tasks) to be performed during execution of the software application. The other tasks 110, 120, and 140 may be tasks of lesser importance (e.g., secondary tasks, preparatory tasks, or optional tasks) that may be performed during execution of the software application.

In the example shown, the task 120 has a dependency upon the task 110. In other words, the task 120 depends on completion of the task 110, and proper execution of the task 120 requires that the task 110 be executed before the task 120. Similarly, the task 130 depends on the task 120; the task 140 depends on the task 110; and each of the tasks 150 and 160 depends on the task 140.

While the above-described dependencies are satisfied by the execution schedule shown in FIG. 1, it is not necessary that, for example, the task 160 be executed after the task 150. Rather, even though execution of the task 160 is scheduled to occur after execution of the task 150, the task 160 is actually executable any time after execution of the task 140, from which the task 160 depends, regardless of execution of the task 150. Accordingly, execution of the tasks 110-160 may be parallelized to a significant degree in a multi-threaded implementation of the software application.

Figure 2:
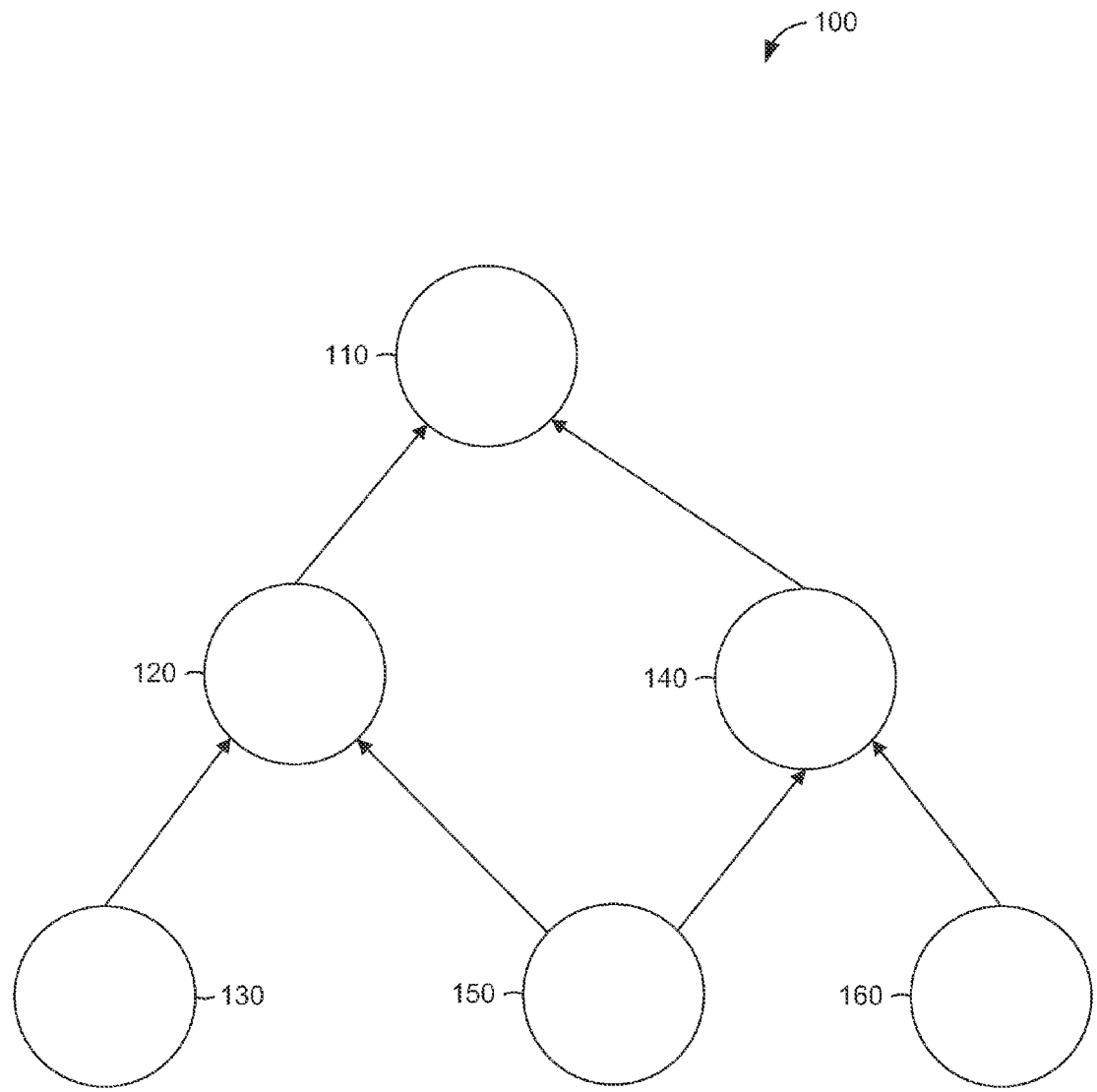
FIG. 2 is a diagram illustrating an alternative example of an execution schedule for the set of tasks, according to some example embodiments.

FIG. 2 is a diagram illustrating an alternative example of an execution schedule for the set 100 of the tasks 110-160. In the example shown, the tasks 110-160 are scheduled for multi-threaded execution (e.g., execution of one or more tasks at a time). The task 110 is scheduled to be executed first. As noted above with respect to FIG. 1, the tasks 120 and 140 each depend on the task 110, but neither of task 120 or 140 is dependent upon the other. Hence, the tasks 120 and 140 may be scheduled for concurrent execution (e.g., parallelized execution), resulting multi-threaded execution of the tasks 120 and 140. According to various example embodiments, DGTaskExecutor implements an active form of concurrent execution, in which the tasks 120 and 140 are constrained to be executed fully or partially concurrently (e.g., their respective executions overlapping in time). For example, the tasks 120 and 140 may be scheduled in a synchronized manner to begin execution contemporaneously (e.g., at substantially the same time), to complete execution contemporaneously, or any suitable combination thereof. In certain example embodiments, DGTaskExecutor implements a passive form of concurrent execution, in which the tasks 120 and 140 are allowed to execute concurrently but are scheduled independently of one another.

Similarly, as noted above, the task 130 depends on the task 120, and each of the tasks 150 and 160 depend on the task 140. The task 150 has two dependencies; the task 150 depends on the task 120 and the task 140. Accordingly, the task 130 is scheduled for execution any time after execution of the task 120; the task 150 is scheduled for execution anytime after execution of the tasks 120 and 140; and the task 160 is scheduled for execution anytime after execution of the task 140. As shown, the tasks 130, 150, and 160 may be scheduled for concurrent execution, resulting in a multi-threaded execution of the tasks 130, 150, and 160. As with the tasks 120 and 140, concurrent execution of the tasks 130, 150, and 160 may be active or passive in form.

Returning to FIG. 1, in a single-threaded implementation of the software application, one data processing resource is used at a time. Examples of the data processing resource include: a processor, a database (e.g., a connection to a database), and a service (e.g., a connection to a server to provide the service).

Returning to FIG. 2, in a multi-threaded implementation of the software application, one or more data processing resources may be used at a time. As used herein, "multi-threaded" means fully or partially multi-threaded.

According to various example embodiments, the software application may specify one or more resource constraints (e.g., constraints on one or more data processing resources). Moreover, resource constraints may be specified by individual tasks corresponding to the software application. Furthermore, user input may be received and used to define one or more resource constraints.

In addition, DGTaskExecutor may allow the software application to configure a number of additional threads (e.g., processing threads beyond a single thread) to be used in processing the tasks of the software application. A data processing resource may have a thread profile (e.g., a resource-thread profile) that indicates a task execution pattern (e.g., a queue of scheduled tasks) for that data processing resource. DGTaskExecutor may adjust (e.g., update) the thread profile to optimize usage of the data processing resource. Based on the availability of resources, one or more of the DGTaskExecutor threads may select (e.g., configure a processor or other data processing resource to select) the highest priority task that can be executed. Tasks may be considered executable once all of their prerequisites have been completed. Once a thread has selected a task, the task may then be executed by the thread (e.g., using a processor configured by the thread) and the task may be no longer considered as executable.

An additional protection may be implemented the system to further avoid deadlock. Specifically, the DGTaskExecutor may be configured to complete once the last task finishes its execution (and no other tasks were made executable or are waiting for resources). This may be done regardless of the number of tasks that remain within the dependency model waiting for dependencies to complete. In some example embodiments, this situation can only arise if a deadlock missed being detected (e.g., because of a race condition). Regardless of cause, these "missed" tasks would not have been executed (e.g., because they are deadlocked). Therefore, in various example embodiments, the DGTaskExecutor may safely return and, in some cases, still guarantee that all of the executable workload assigned to the DGTaskExecutor was completed.

A developer of the software application may assign a task to a data processing resource. For example, the data processing resource may be identified by an enumerated value. The developer may assign the task to the enumerated value, and all tasks assigned to the enumerated value will share the same data processing resource and its resource constraints, if any.

Dependencies among tasks may be described in terms of "parent-child" relationships. For instance, where a second task is dependent upon (e.g., must be executed after) a first task, the second task may be described as a child of the first task, and the first task is a parent of the second task. Parent tasks may be described as prerequisites of a child task.

Prerequisites of a task may be static or dynamic. Static prerequisites are parent tasks that are known (e.g., identified in task dependency data) when a task is created or designated for execution. Dynamic prerequisites are parent tasks that are added after results from execution of the static prerequisites are known. For example, dynamic dependencies allow such parent tasks to be added after one or more of the static prerequisites have completed execution. As another example, a new parent task may be added in response to satisfaction of a condition (e.g., evaluated during execution of another parent task).

Similarly, a child task may be created at runtime (e.g., during execution of one or more tasks) and added to the set of tasks. In some example embodiments, execution of multiple software applications designates multiple sets of tasks for execution, and DGTaskExecutor may combine dependencies (e.g., multiple instances of task dependency data) together for task scheduling with shared threads, data processing resources, or constraints on the data processing resources.

DGTaskExecutor may also support joins (e.g., structured query language (SQL) join clauses). In some example embodiments DGTaskExecutor supports two types of joins, which allow for a task to wait for another task (or set of tasks) to complete.

Simple join tasks (e.g., joins) can be added as a synchronization point within a task graph. In some example embodiments, a DGTaskExecutor system may support join tasks that neither add nor impart any priority within the task graph. A task can also, at runtime, ask to join on an existing task. When this happens, the thread executing the task pauses execution of the currently executing task, and instead, executes other tasks until the join task has completed. Use of one or more join tasks may have the effect of avoiding a deadlock in which all threads in a system are waiting for some other join task to complete, but as all threads are waiting, there are no threads to do work. Moreover, the pause in execution may facilitate a performance optimization such that worker threads spend a minimum amount of time blocked (e.g., waiting for an available task).

DGTaskExecutor may also support the ability to pass data to tasks via a context. When initially adding a task to a dependency model (e.g., a dependency graph), a caller (e.g., calling function of a software application) may specify a context (e.g., a context object) that is to be passed to the task. Context objects may provide useful details from the software application that may be utilized during execution of a task or during determination of a set of prerequisites for a task. An example of a context object is a normalized set of inputs (e.g., input data) received with a web server request.

According to some example embodiments, task data (e.g., task dependency data) specifies a task identifier (e.g., Task ID) that uniquely identifies the task within DGTaskExecutor. For example, the task identifier may be an enumerated value. Task data may also specify a data processing resource to be utilized by the task, as well as one or more constraints on the data processing resource.

Task data (e.g., task configuration data, may specify an ability to constrain a number of concurrently executing tasks that may utilize a particular data processing resource. The task data may specify usage of the data processing resource as being unconstrained (e.g., unbounded). For example, lightweight business logic (e.g., aggregate results from subtasks) may utilize the data processing resource in an unconstrained matter. The task data may specify a constraint upon the usage of the data processing resource. Specifying a constraint may have the effect of limiting a maximum concurrent utilization of one or more data processing resources to a fixed (e.g., predetermined) number of concurrent executions. In various example embodiments, a fixed number of concurrent executions may have the effect of reducing a likelihood of overburdening the data processing resource when executing tasks (e.g., rendering three-dimensional models, processing large data sets, or other processor-intensive activities). The task data may specify that the task is not executable or otherwise will not impact the data processing resource. For example, a task may be utilized solely to orchestrate subtasks (e.g., joins), and the task therefore never actually utilizes the data processing resource. The task data may specify information (e.g., metadata) pertinent to the data processing resource. For example, where the data processing resource is a database, the task data may specify a logical host or tier of the database.

Task data may specify any number of prerequisites (e.g., a parent task) or no prerequisites, if none are needed. As noted above, a prerequisite may be static or dynamic. Taken together, static and dynamic prerequisites, if any, represent a minimum set of tasks required for a task to execute. Task data may specify a method that represents work to be accomplished by execution of the task, as well as information pertinent to handling of exceptions, errors, or results generated by the method.

DGTaskExecutor may also support an ability to save a result (e.g., store information resultant from the execution of a task). DGTaskExecutor may access (e.g., load) results from any task, and DGTaskExecutor may update (e.g., modify or clear) results from any task. Tasks may support the ability to save information for access by other tasks or the calling software application. If there is a need to garbage-collect the object early (e.g., before fully processing a software application), a method may also be provided by DGTaskExecutor.

DGTaskExecutor may also support runtime inspection or auto-deduping of tasks within a task graph. Deduping, as used herein, refers to identifying duplicate tasks. In various example embodiments, deduping includes inhibiting execution of one or more duplicate tasks (e.g., ignoring the task, removing the task, deleting the tasks, or preventing the task from executing).

DGTaskExecutor may also support detection of deadlocks (e.g., circular patterns of dependencies). According to some example embodiments, DGTaskExecutor avoids deadlocks, rather than prevents deadlocks. If a deadlock is detected, DGTaskExecutor may raise an exception and save a "safe" version of the dependency model, DGTaskExecutor may then proceed to execute the set of tasks to "completion," even if proceeding will result in one or more individual tasks being completed in an "error state."

When adding tasks to the dependency model (e.g., a dependency graph), DGTaskExecutor may use a lightweight algorithm to evaluate static prerequisites. When a task is added, DGTaskExecutor evaluates all of the new "static" prerequisite tasks to be added to expand the graph represented by this task and discover the set of previously unknown tasks that also need to be registered into the dependency model. This new set of tasks may then be sorted (e.g., by DGTaskExecutor) via topological sort so that the least dependent task will be added to the dependency model first. The now sorted list may be processed in order, and the DGTaskExecutor may ensure that for each new task added to the dependency model all of the prerequisites for the task are known (which may be guaranteed by the topological sort). Furthermore, DGTaskExecutor may ensure that all of the prerequisites are not in a deadlocked state already. In some example embodiments, deadlocks are detected if, for some reason, the validation shows that a prerequisite for a task was not registered before the task itself was registered, It is in this way that the DGTaskExecutor may guarantee that the dependency model is always in a safely executable state. If a task cannot be added to the dependency model (e.g., because one of its prerequisites was not created), a circular dependency pattern exists and may be detected by DGTaskExecutor In certain example embodiments, the final step of registration of a task in the dependency model is to rescore the model so that the task's priorities for the task itself and for its prerequisites properly model the importance of the task within the system. Rescoring may be implemented in various example embodiments so that the threads (e.g., data processing resources configured by the threads) select the most important task that is waiting to execute.

Existing tasks may not need evaluation in this algorithm, for example, because none of the existing tasks has a dependency on any of the new tasks that are being added to the dependency model. This may happen because DGTaskExecutor only adds previously unknown tasks to the dependency model. If that dependency had existed previously, the task is already in the dependency model, and as such, DGTaskExecutor would not need to add it.

For dynamic prerequisites and joins, a more complex and expensive algorithm may be used to detect deadlock. The algorithm evaluates whether any prerequisite tasks of the new dependency is dependent on the task adding the dynamic prerequisite or join. The algorithm may facilitate ensuring that, even with this new dynamic prerequisite, the dependency model is still safely executable, and that all of that task's children are able to execute. In the event that a deadlock is detected, all of the tasks that are dependent upon the task that is adding the dynamic dependency may be marked (e.g., by DGTaskExecutor in accordance with the algorithm) as failed within the graph.

The DGTaskExecutor may maintain a state machine for each task as it is being processed by the system. According to various example embodiments, the states in order are:

Initial State—this is a state of a task before it has been registered;

Static Prerequisite Registration—this is a state where the static prerequisites are expanded and registered within the dependency model;

Wait for static prerequisite completion—this state indicates that the task is waiting for the static prerequisites to complete;

Dynamic Prerequisite Registration—this is a state where the task can load data from static prerequisites, and then choose to register new tasks as dependencies;

Wait for dynamic prerequisite completion this state indicates that the task is waiting for the dynamic prerequisites to complete;

Wait for resource availability to execute once all prerequisites have completed, this state may be used to indicate that the task is to wait for resources to become available so that the task can execute and return a result;

Execute—this state indicates that the task performs the duties configured for it by the developer of the task; and Completion—this state indicates that the task has finished executing and that the results or exceptions generated by the execution are available for loading by any dependent tasks. Additionally, in the Completion state, any dependent tasks whose prerequisites are now satisfied me be moved into the "Wait for resource availability to execute" state.

DGTaskExecutor may also support a sharing of data from a processing thread of a parent task with a processing thread of its child task. Examples of such data include ThreadLocal Cache and application context objects.

According to various example embodiments, execution of a task is dependent on results from its prerequisites, if any. Any exception, error, or results arising from execution of the task is made available by DGTaskExecutor to any other task that requests some or all of this information.

DGTaskExecutor may contain primary controls for generating a dependency model (e.g., dependency model data). The following method may be called with one or more tasks to be designated for execution:

```
public final class DGTaskExecutor
/*
 * executeAndWait
 *
 * This method will start executing the task (as well
 * as any other tasks within the task hierarchy) in
 * parallel.
 *
 * The calling thread will wait until the specified task
 * has executed and will return.
 */
public <ContextType> void executeAndWait(IDGTask<? super
ContextType> taskToExecute, ContextType taskContext)
/*
 * executeAndWait
 *
 * This method will start executing the specified tasks
 * (as well as any other tasks within the task
 * hierarchy) in parallel.
 *
```

```
 * The calling thread will wait until the specified task
 * has executed and will return.
 */
public <ContextType> void executeAndWait (BaseEnum
taskId, List<? extends IDGTask<? super ContextType>>
tasksToExecute, ContextType taskContext)
```

Figure 3:
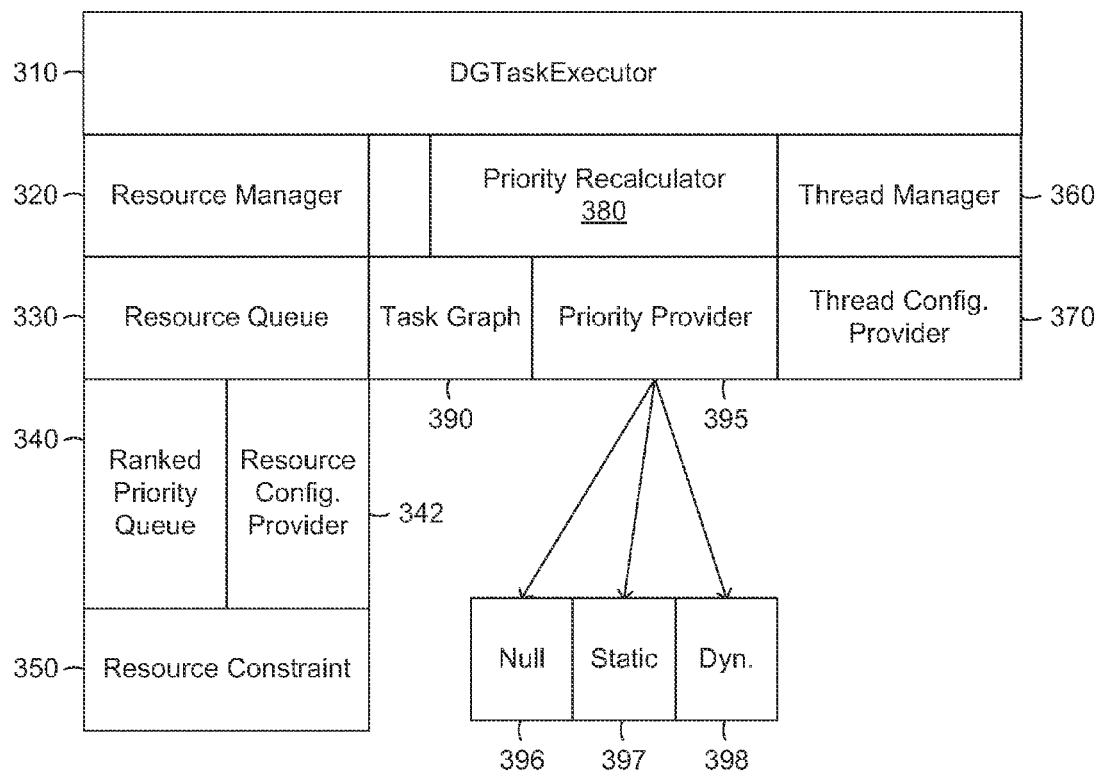
FIG. 3 is an architectural diagram illustrating data structures supporting DGTaskExecutor, according to some example embodiments.

FIG. 3 is an architectural diagram illustrating data structures 310, 320, 330, 340, 342, 350, 360, 370, 380, 390, 395, 396, 397, and 398 supporting DGTaskExecutor, according to some example embodiments. DGTaskExecutor 310 is shown to be built on Resource Manager 320, Task Graph 390, Priority Recalculator 380, and Thread Manager 360.

Resource Manager 320 manages Resource Queue 330, which is supported by Ranked Priority Queue 340 and Resource Configuration Provider 342, Ranked Priority Queue 340 and Resource Configuration Provider 342 are supported by Resource Constraint 350. Priority Recalculator 380 is supported by Task Graph 390 and Priority Provider 395, which provides an interface (e.g., a pluggable interface) for scoring algorithms to be created. In some example embodiments, three types of priority algorithms are supported: Null 396, Static 397, and Dynamic 398.

A ranked priority queue (e.g., Ranked Priority Queue 340) is a data structure (e.g., a priority queue or a heap) that may allow for random access, which may be an efficient way to access the data structure. The ranked priority queue allows a value (e.g., a rank) of a node to change independently of the value used to rank the queue. In the context of concurrent execution of tasks, the ranked priority feature results in a valid ordering of the queue, even though a rank of a given node may be changing. Changes to priority may be "published" to the ranked priority queue at a later time, after which a DGTaskExecutor system fetches a new rank and readjusts the queue with respect to priority.

A resource constraint class (e.g., Resource Constraint 350) may define a type of constraint on a data processing resource. For example, the type may be "fixed" (e.g., with a fixed number of data processing resources or "unbounded" (e.g., with no constraint).

A resource queue class (e.g., Resource Queue 330) may manage a number of data processing resources available with respect to a given data processing resource. Tasks stored within this class (e.g., task in queue) may be stored in priority order, so that a task with a highest priority will have the first chance to utilize a given data processing resource. The resource queue class may be built upon the ranked priority queue class and the resource constraint class.

A resource manager class (e.g., Resource Manager 320) may manage one or more data processing resources, one or more resource queries (e.g., queries regarding capacity, constraints, or status of a data processing resource), one or more executable tasks, or any suitable combination thereof. In some example embodiments, the resource manager class is implemented as a group of resource queue classes.

A resource configuration provider class (e.g., Resource Configuration Provider 342) manages the set of resource constraints that exist within the system. This class allows for both the modification of resource constraints within the system at runtime as well as providing abuse configuration/implementation that can be overridden at compile time.

A priority provider class (e.g., Priority Provider 395) may calculate an additional priority to be added to a given task. In some example embodiments, DGTaskExecutor 310 supports three types. In these example embodiments, null priority (e.g., Null 396) always has a value of zero, such that all tasks in the dependency model have equal priority. Static priority (e.g., Static 397) always has a value of one. The priority of a task may be equal to a number of children that are dependent on the task. Dynamic priority (e.g., Dynamic 398) may vary based on the structure of a task graph. For example, the priority that tasks pass to parent tasks may degrade in a consistent fashion depending on position of the task in the dependency model (e.g., closer to the root node where no further parent tasks exist). Dynamic priority may prioritize execution of tasks based on the structure of a task graph and may favor sets of tasks that have wide dependency models with many parallelizable tasks.

A thread configuration provider class (e.g., Thread Configuration Provider 370) may provide a thread configuration to the Thread Manager 360, which manages threads (e.g., in conjunction with the Priority Recalculator 380 and the Resource Manager 320).

A priority recalculator class (e.g., Priority Recalculator 380) may recalculate a priority added to a dependency model by a dependency (e.g., a newly added dependency from a newly added task). For example, the priority recalculator class may add additional priority to each parent task of a newly added task.

A task graph class (e.g., Task Graph 390) may allow a software application to describe a dependency model (e.g., task graph). Analysis of the dependency model may be performed by a DGTaskExecutor system to adjust the priority of one or more nodes within the dependency model, as well as to detect deadlocks. The task graph class may store representations of one or more child nodes of a task. These child nodes may be used to find further tasks that may become executable. The task graph class may facilitate finding tasks. Moreover, the task graph class may facilitate loading or storing intermediate task results based on a task identifier of a task. In general, the task graph class may manage the set of tasks that have been registered with DGTaskExecutor 310.

Moreover, a task manager class (not shown) may provide an internal façade for the whole task executor. The task manager class may facilitate one or more user-facing activities (e.g., managing addition of tasks to the dependency model, managing when dynamic prerequisites should be fetched, how joins are managed, or deadlock detection) and may be built upon a priority recalculator class (e.g., Priority Recalculator 380), a task graph class (e.g., Task Graph 390), a resource manager class (e.g., Resource Manager 320), or any suitable combination thereof.

The DGTaskExecutor 310 class may support an external interface (e.g., a class) for accessing DGTaskExecutor (the system, the method, or both) through utilization of the task manager class to provide DGTaskExecutor services.

Figure 4:
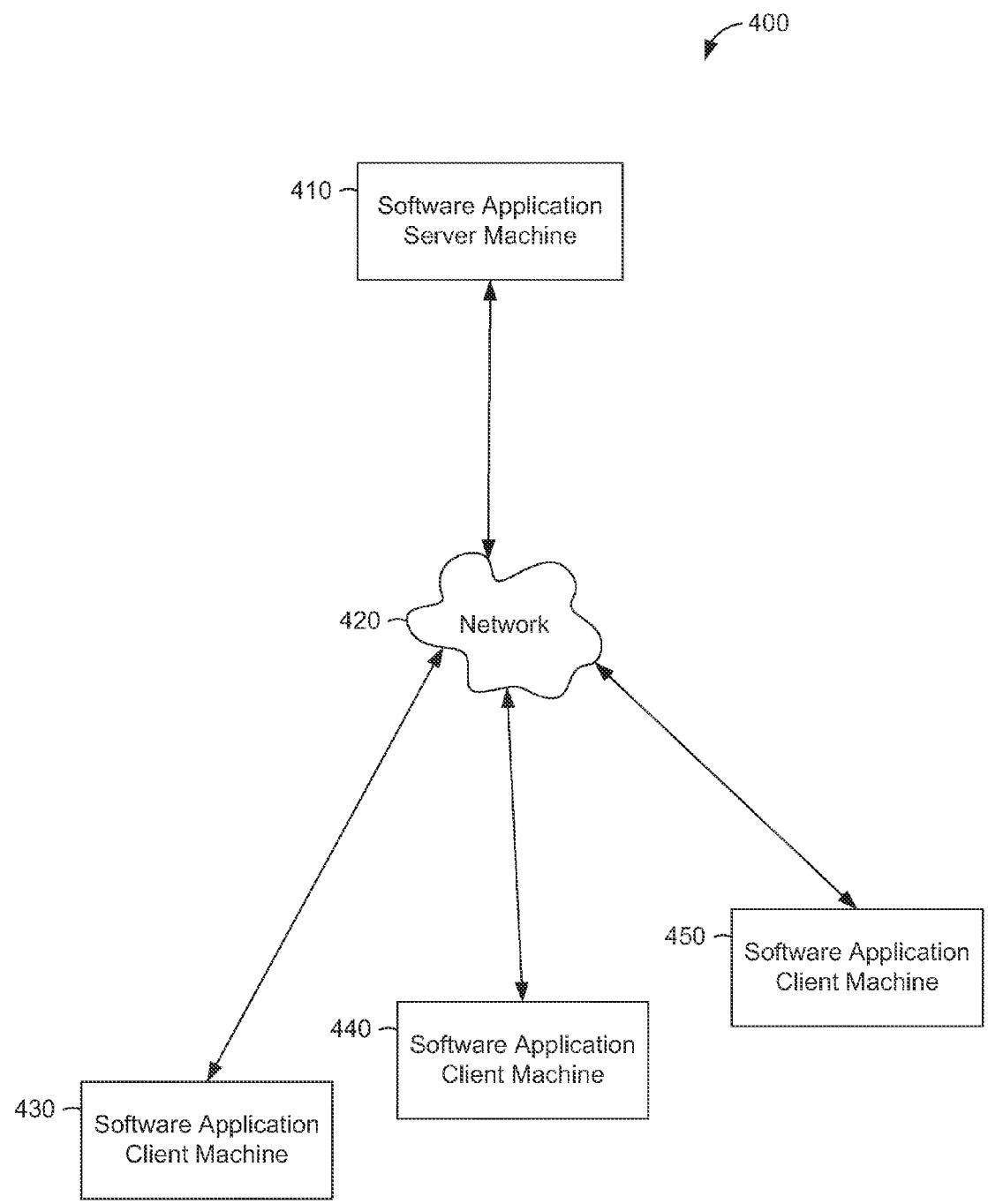
FIG. 4 is a network diagram illustrating a network environment, according to some example embodiments.

FIG. 4 is a network diagram illustrating a network environment 400, according to some example embodiments. The network environment 400 is shown to include a software application server machine 410 and software application client machines 430, 440, and 450, all coupled to each other via a network 420.

Any of the machines shown in FIG. 4 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 12, below. Moreover, any two or more of the machines illustrated in FIG. 4 may be combined into a single machine, and the functions described herein for any single machine may be subdivided among multiple machines.

The network 420 may be any network that enables communication between machines (e.g., the software application server machine 410 and the software application client machine 430). Accordingly, the network 420 may be a wired network, a wireless network, or any suitable combination thereof. The network 420 may include one or more portions that constitute a private network, a public network (e.g., the Internet), or any suitable combination thereof.

Figure 5:
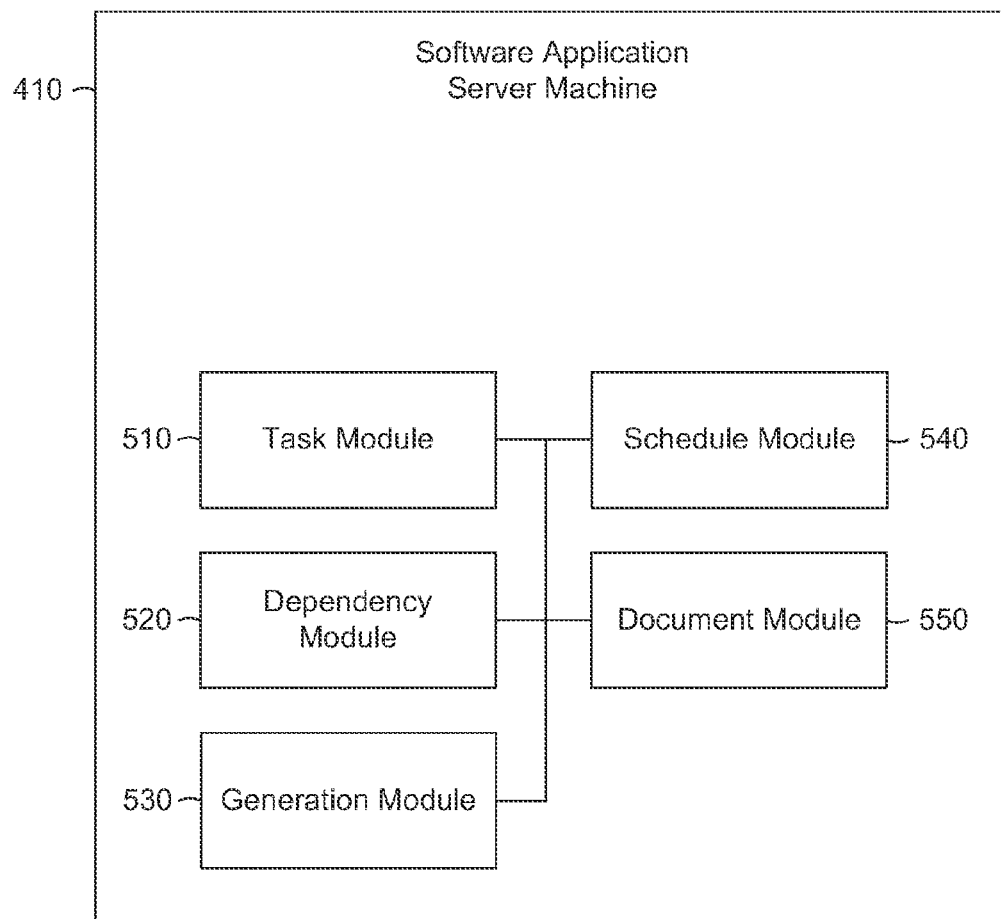
FIG. 5 is a block diagram of a software application server machine, according to some example embodiments.

FIG. 5 is a block diagram of the software application server machine 410, according to some example embodiments. The software application server machine 410 is shown to include a task module 510, a dependency module 520, a generation module 530, a schedule module 540, and a document module 550, all coupled (e.g., configured) to communicate with each other (e.g., via a bus, a shared memory, or a switch). Any of these modules may be implemented using hardware or a combination of hardware and software. Moreover, any two or more of these modules may be combined into a single module, and the functions described herein for a single module may be subdivided among multiple modules.

Figure 6:
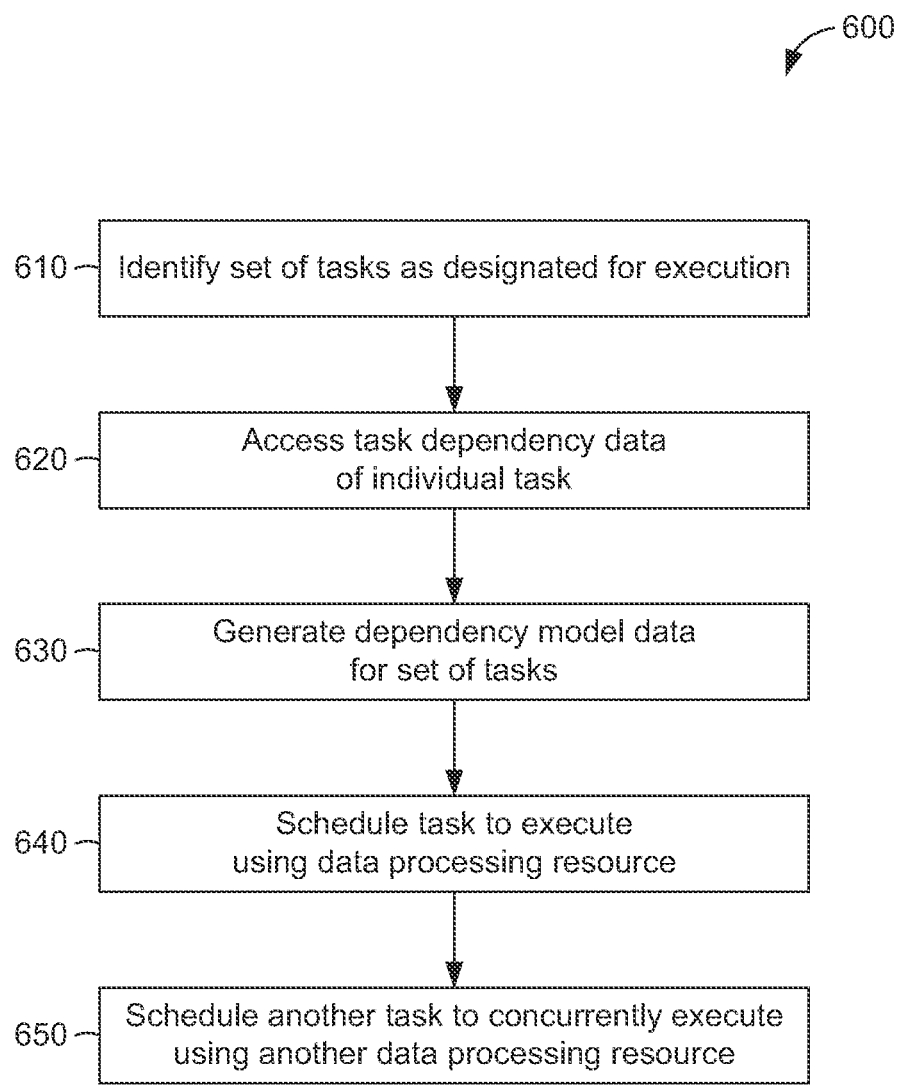
FIG. 6-11 are flowcharts illustrating operations in a method of dependency-based task scheduling, according to some example embodiments.

FIG. 6-11 are flowcharts illustrating operations in a method 600 of dependency-based task scheduling, according to some example embodiments. FIG. 6 illustrates a simple example of the method 600. FIG. 7-11 illustrate various optional or alternative paths of the method 600.

As shown in FIG. 6, the method 600 includes:
identifying 610 a set of tasks as being requested for execution, with the set of tasks including a first task and a second task;
accessing 620 task dependency data of the second task (e.g., from a cache), with the task dependency data indicating that the first task is to be executed prior to the second task;
generating 630 dependency model data of the set of tasks based on the task dependency data, with the dependency model data indicating that the first task is to be executed prior to the second task, and the generating of the dependency model data being performed by a processor of a machine; and
scheduling 640 an execution of the first task using a data processing resource based on the dependency model data, with the first task being scheduled for execution using the data processing resource prior to an execution of the second task. Scheduling 650 of another task is discussed below.

The identifying 610 may be performed by the task module 510. The accessing 620 may be performed by the dependency module 520. The generating 630 may be performed by the generation module 530. The scheduling 640 may be performed by the schedule module 540.

Figure 7:
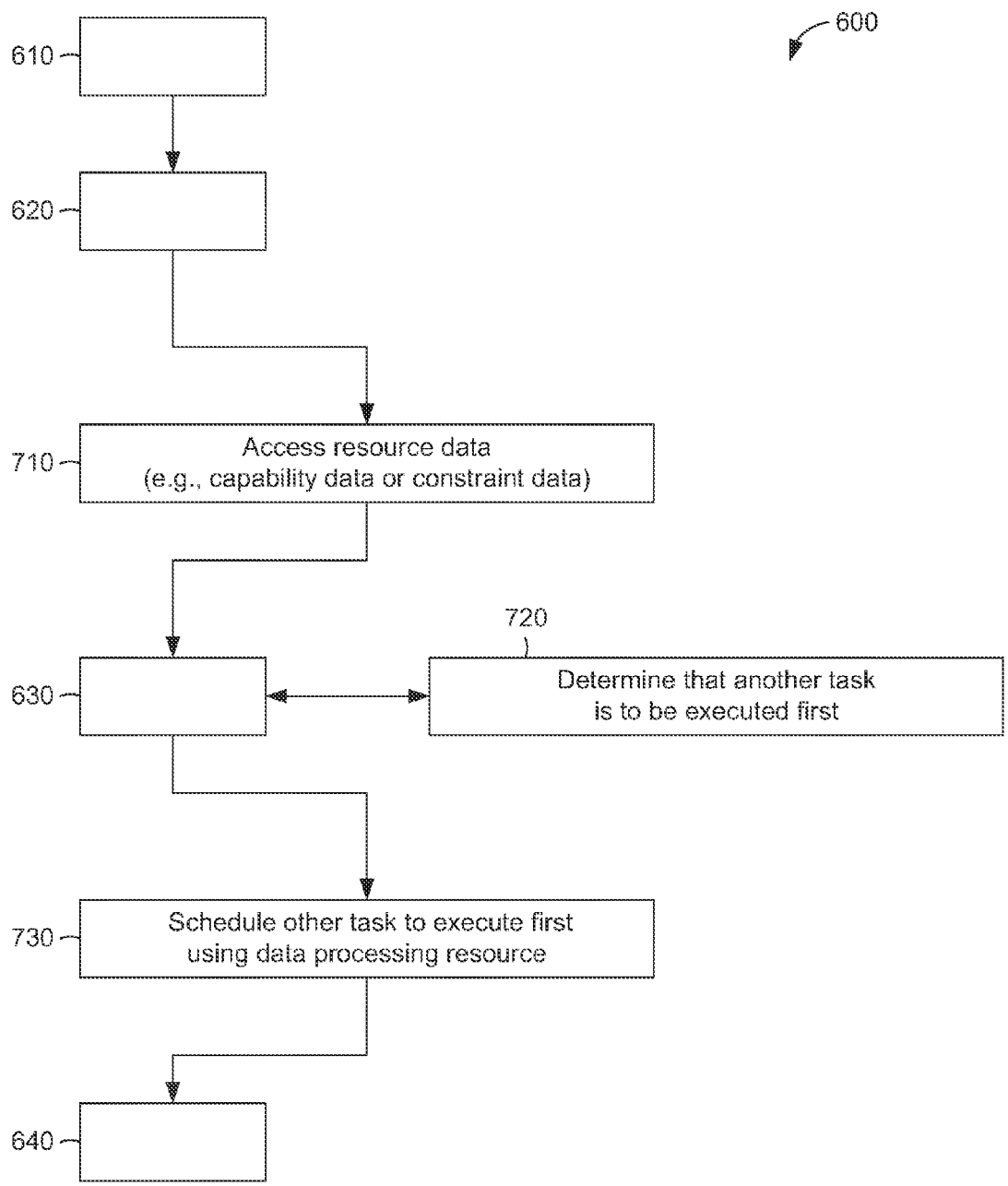

Moreover, as shown in FIG. 7, the method 600 may include:
accessing 710 resource data of the data processing resource; and
scheduling 730 an execution of a third task of the plurality of tasks, with the third task being scheduled for execution by the data processing resource prior to the execution of the first task; wherein:
the generating of the dependency model data 630 is further based on the resource data and includes determining 720 that a third task of the plurality of tasks is to be executed prior to the first task; and
the dependency model data indicates that the third task is to be executed prior to the first task.

The accessing 710 may be performed by the dependency module 520. The determining 720 may be performed by the generation module 530. The scheduling 730 may be performed by the schedule module 540.

In some example embodiments, the resource data indicates at least one of a capability of the data processing resource or a constraint on the data processing resource.

In certain example embodiments, the data processing resource is at least one of a hardware resource, a software resource, a network resource, or a service resource.

In various example embodiments, the data processing resource is at least one of a database connection or the processor of the machine.

Figure 8:
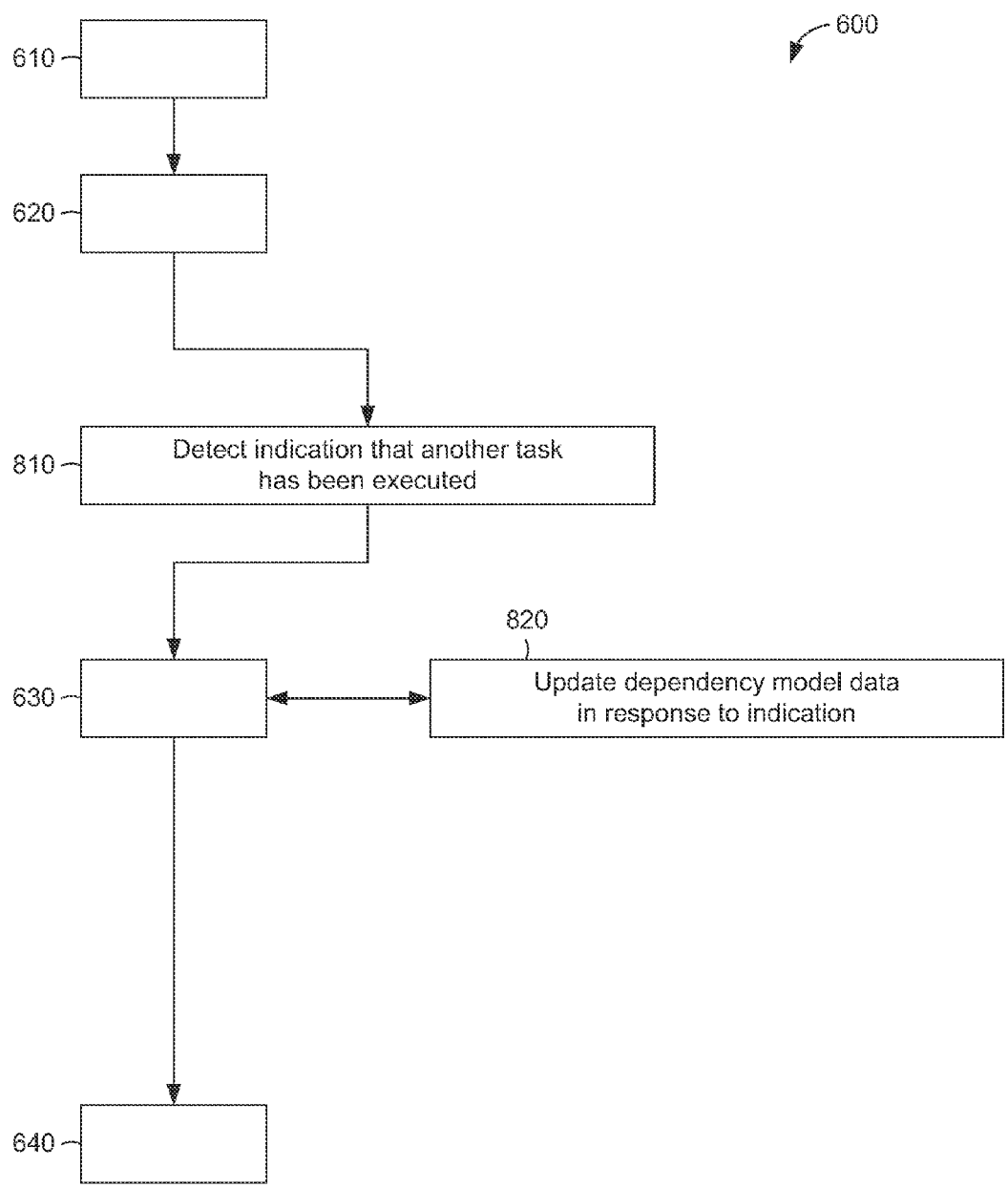

As shown in FIG. 8, the method 600 may include detecting 810 an indication that a third task of the set of tasks has been executed. In some situations, the generating of the dependency model data includes updating 820 the dependency model data in response to the indication, with the updating of the dependency model data being based on further task dependency data of the third task. The detecting 810 may be performed by the dependency module 520. The updating 820 may be performed by the generation module 530.

Figure 9:
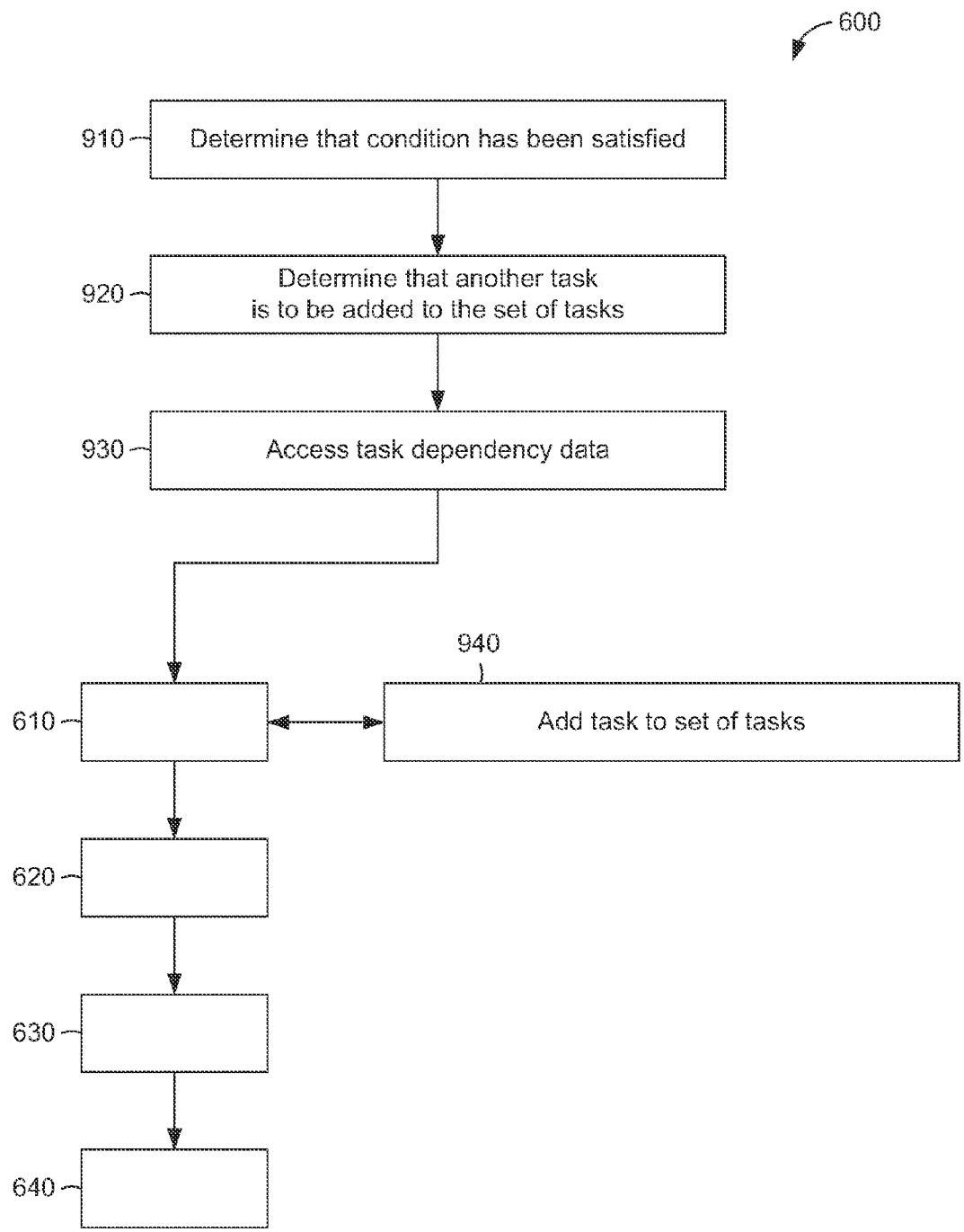

As shown in FIG. 9, the method 600 may include determining 910 that a condition pertinent to the first task has been satisfied, with the condition being pertinent to the execution of the first task prior to the execution of the second task. In certain situations, the identifying 610 of the plurality of tasks includes adding 940 the first task to a further plurality of tasks that includes the second task. The determining 910 may be performed by the task module 510. The adding 940 may be performed by the task module 510.

FIG. 9 further illustrates that method 600 may include: determining 920 that a further task is to be added to the set of tasks, with the determining being performed during at least one of the execution of the first task or the execution of the second task; and adding 940 the further task to the set of tasks. The determining 920 may be performed by the task module 510.

Still referring to FIG. 9, the method 600 may include: accessing 930 further task dependency data of the further task, with the further task dependency data indicating that the further task is to be executed after at least one of the execution of the first task of the execution of the second task; and updating the dependency model data based on the further task dependency data. The accessing 930 may be performed by the task module 510.

Figure 10:
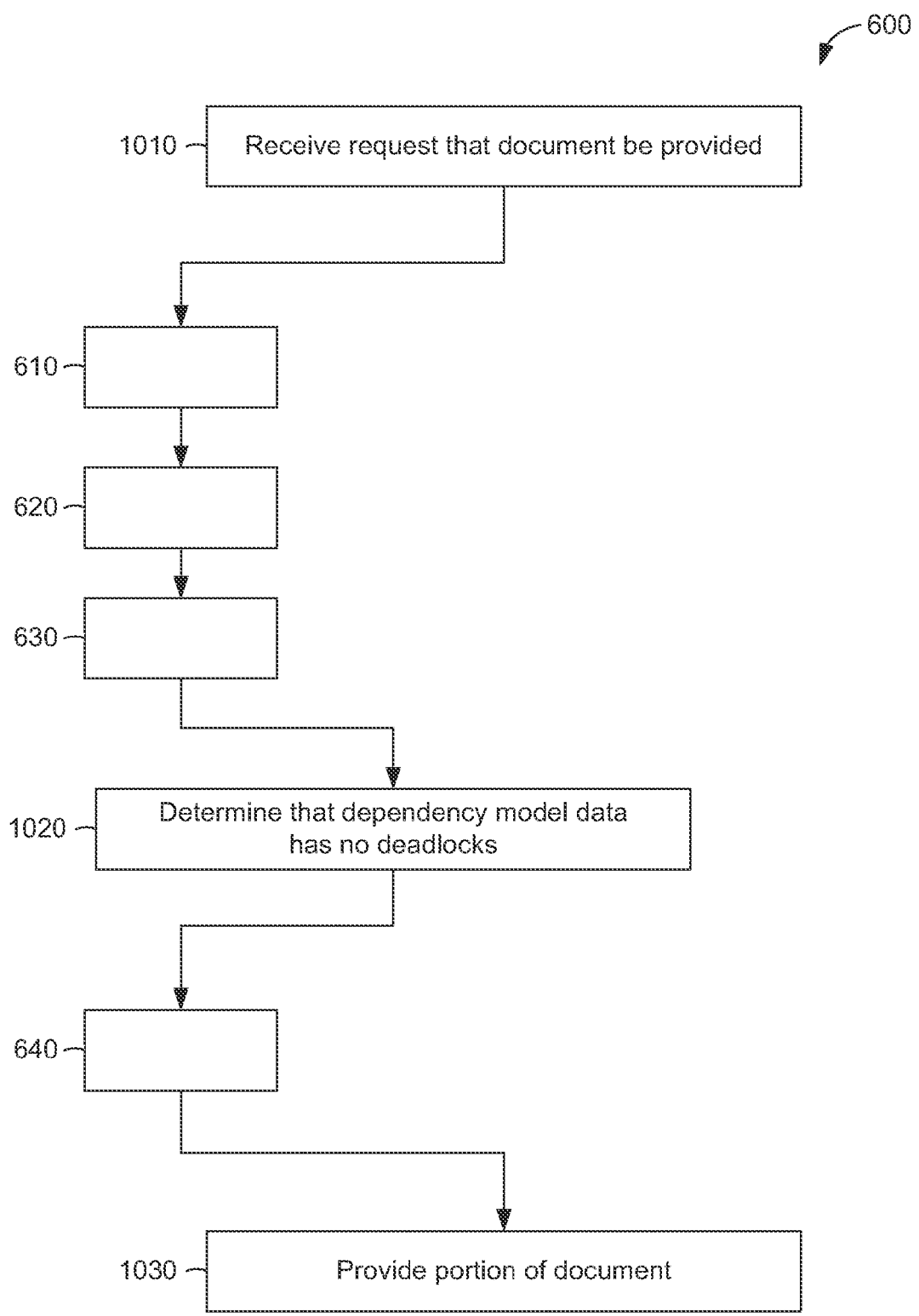

As shown in FIG. 10, the method 600 may include determining 1020 that the dependency model data is devoid of information indicating that the second task is to be executed prior the first task. The determining 1020 may be performed by the generation module 530.

FIG. 10 further illustrates that the method 600 may include receiving 1010 a request that a document be provided to a user, with the document including a portion definable by information resultant from the execution of the first task. In some situations, the identifying 610 of the set of tasks is in response to the request. The receiving 1010 may be performed by the task module 510.

According to some example embodiments, the document corresponds to a network-based locator; the request includes the network-based locator; and the document module is configured to generate the document based on the information resultant from the execution of the first task.

Still referring to FIG. 10, the method 600 may include providing 1030 the portion of the document to the user after the execution of the first task and during the execution of the second task. In various situations, a further portion of the document is definable by further information resultant from the execution of the second task. The providing 1030 may be performed by the document module 550.

Returning to FIG. 6, the method 600 may include scheduling 650 an execution of a third task of the set of tasks, with the execution of the third task being scheduled as contemporaneous with the execution of the first task. The scheduling 650 may be performed by the schedule module 540.

Figure 11:
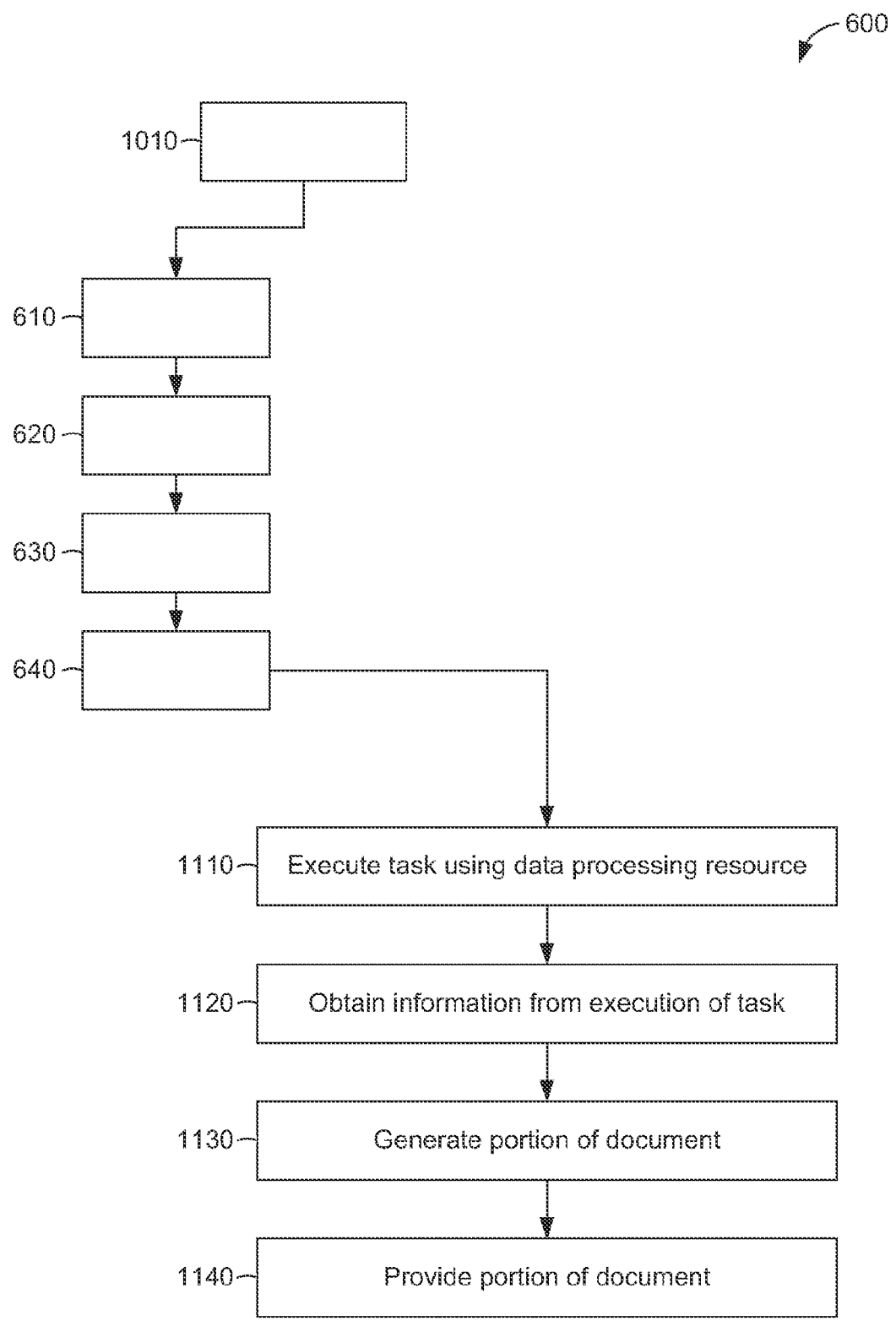

As shown in FIG. 11, the method 600 may include:

obtaining 1120 information resultant from the execution of the first task;

generating 1130 a portion of the document based on the information resultant from the execution of the first task; and providing 1140 the portion of the document in response to a request that identifies a URL of the document.

The obtaining 1120 may be performed by the document module 550. Moreover, the generating 1130 may be performed by the document module 550. Furthermore, the providing 1140 may be performed by the document module 550.

According to certain example embodiments, the first task is defined by a data structure and includes an instruction to perform at least one of the retrieval of data from a database or a conversion of the data.

In some example embodiments, the second task is defined by a data structure that includes the task dependency data.

Still referring to FIG. 11, the method 600 may include executing 1110 the first task using the data processing resource. The executing 1110 may be performed by the document module 550.

According to various example embodiments, one or more of the methodologies described herein may facilitate the scheduling or execution of tasks. In particular, where information regarding dependencies among tasks is available (e.g., as task dependency data corresponding to one or more tasks), one or more of the methodologies discussed herein may facilitate full or partial optimizations in task scheduling and task execution. Accordingly, one or more of the methodologies discussed herein may obviate a need for single-threaded implementation of the software application (e.g., execution of only one task at a time), which may have one or more technical effects. Examples of technical effects include: enhancing performance of the software application, reducing completion time for execution of tasks corresponding to the software application, and reducing user wait time for provision of a requested document.

Figure 12:
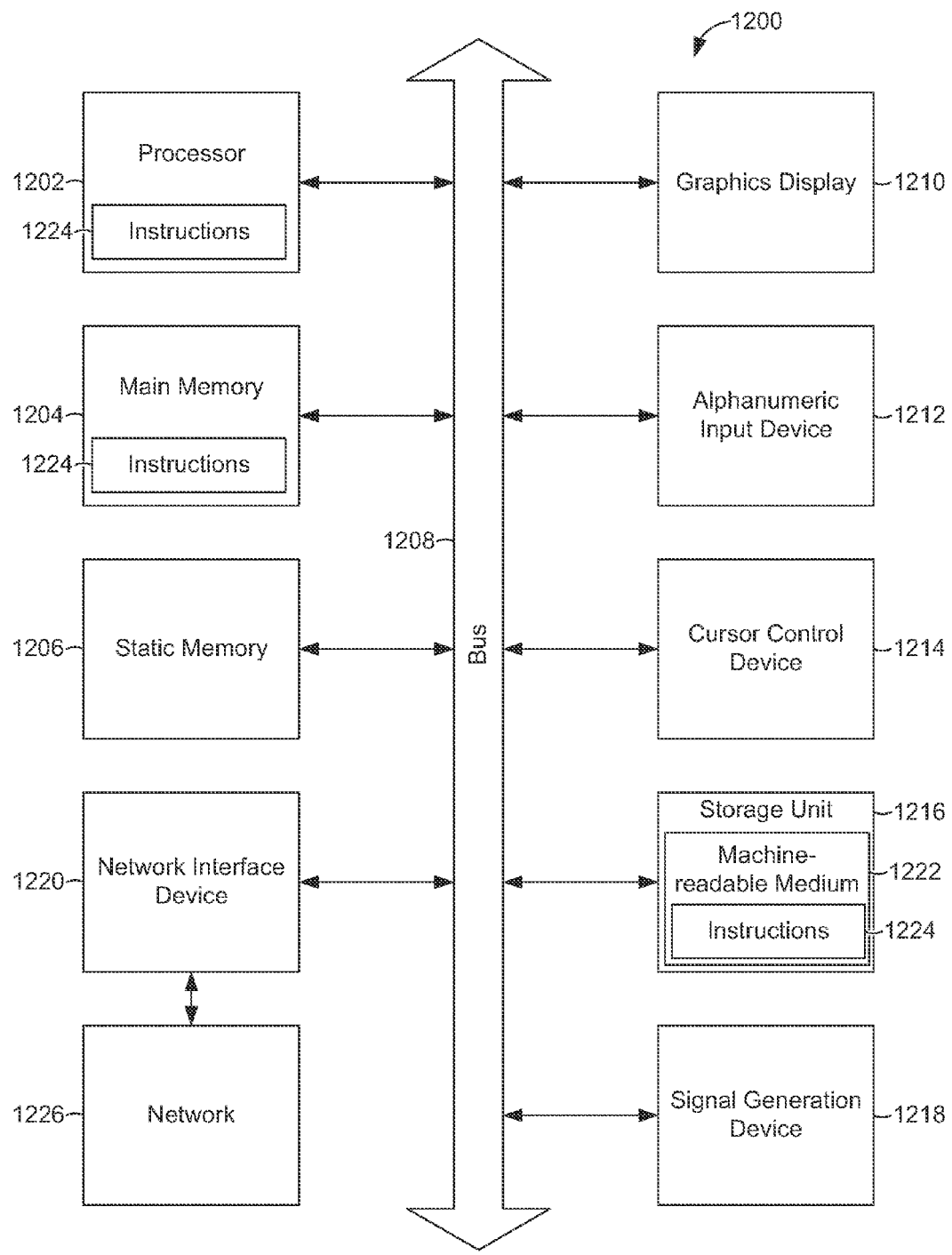
FIG. 12 is a block diagram illustrating components of a machine, according to some example embodiments, able to read instructions from a machine-readable medium and perform any one or more of the methodologies discussed herein.

FIG. 12 illustrates components of a machine 1200, according to some example embodiments, that is able to read instructions from a machine-readable medium (e.g., a non-transitory machine-readable storage medium) and perform any one or more of the methodologies discussed herein. Specifically, FIG. 12 shows a diagrammatic representation of the machine 1200 in the example form of a computer system and within which instructions 1224 (e.g., software) for causing the machine 1200 to perform any one or more of the methodologies discussed herein may be executed. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224 (sequentially or otherwise) that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 is shown to include a processor 1202 (e.g., a central processing unit (CPU), a graphics processing unit (GPU), a digital signal processor (DSP), application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 a speaker), and a network interface device 1220.

The storage unit 1216 includes a machine-readable medium 1222 on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 420) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., software) for execution by the machine, such that the instructions, when executed by one or more processors of the machine (e.g., processor 1202), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising;
identifying a plurality of tasks as being requested for execution, the plurality of tasks including a first task, a second task, and a third task;
accessing task dependency data of the second task, the task dependency data indicating that the first task is to be executed prior to the second task;
generating first dependency model data of the plurality of tasks based on the task dependency data, the first dependency model data indicating that the first task is to be executed prior to the second task and that, the third task is to be executed after the second task, the generating of the first dependency model data being performed by a processor of a machine:
scheduling an execution of the first task using a data processing resource based on the first dependency model data, the first task being scheduled for execution using the data processing resource prior to an execution of the second task;
generating a result by executing the first task according to the execution schedule of the first task;
generating second dependency model data to indicate that the execution sequence of the second task and the third task has changed based on the result of the execution of the first task; and
scheduling an execution of the third task using a data processing resource based on the second dependency model data, the third task being scheduled for execution using the data processing resource prior to the execution of the second task.

2. The method of claim 1 further comprising:
accessing resource data of the data processing resource; and
scheduling an execution of a fourth task of the plurality of tasks, the fourth task being scheduled for execution by the data processing resource prior to the execution of the first task; wherein:
the generating of the first dependency model data is further based on the resource data and includes determining that the fourth task of the plurality of tasks is to be executed prior to the first task; and
the first dependency model data indicates that the fourth task is to be executed prior to the first task.

3. The method of claim 2, wherein:
the resource data indicates at least one of a capability of the data processing resource or a constraint on the data processing resource.

4. The method of claim 1, wherein:
the data processing resource is at least one of a hardware resource, a software resource, a network resource, or a service resource.

5. The method of claim 4, wherein:
the data processing resource is at least one of a database connection or the processor of the machine.

6. The method of claim 1 further comprising:
detecting an indication that a fourth task of the plurality of tasks has been executed; wherein
the generating of the second dependency model data includes updating the second dependency model data in response to the indication, the updating of the second dependency model data being based on further task dependency data of the fourth task.

7. The method of claim 1 further comprising:
determining that a condition pertinent to the first task has been satisfied, the condition being pertinent to the execution of the first task prior to the execution of the second task; wherein
the identifying of the plurality of tasks includes adding the first task to a further plurality of tasks that includes the second task.

8. The method of claim 1 further comprising:
determining, during execution of at least one of the first task or the second task, that a fourth task is to be added to the plurality of tasks;
adding the fourth task to the plurality of tasks:
accessing further task dependency data of the fourth task, the further task dependency data indicating that the fourth task is to he executed after at least one of the execution of the first task and the execution of the second task; and
updating the dependency model data based on the further task dependency data.

9. The method of claim 1 further comprising:
determining that the first dependency model data is devoid of information indicating that the second task is to be executed prior the first task.

10. The method of claim 1, wherein the second task includes a dynamic prerequisite and the generating of the second dependency model data to indicate that the third task is to be executed prior to the second task is based on a determination that the result of the execution of the first task includes a satisfaction of the dynamic prerequisite.

11. A system comprising:
a task module configured to identify a plurality of tasks as being in need of execution, the plurality of tasks including a first task, a second task, and a third task;
a dependency module configured to access task dependency data of the second task, the task dependency data indicating that the first task is to he executed prior to the second task;
a processor configured by a generation module, the generation module configuring the processor to generate dependency model data of the plurality of tasks based on the task dependency data, the dependency model data indicating that the first task is to be executed prior to the second task and that the third task is to be executed after the second task;
a schedule module configured to schedule an execution of the first task using a data processing resource based on the dependency model data, the first task being scheduled for execution using the data processing resource prior to an execution of the second task;
the task module being further configured to examine the result of the execution of the first task and based upon that result, update the dependency model data to change the relative execution priority of the third task so that the third task is executed prior to the second task; and
the schedule module being further configured to schedule an execution of the third task using a data processing resource based on the second dependency model data, the third task being scheduled for execution using the data processing resource prior to the execution of the second task.

12. The system of claim 11 further comprising:
a document module configured to receive a request that a document be provided to a user, the document including a portion definable by information resultant from the execution of the first task; wherein:
the identification module is configured to identify the plurality of tasks in response to the request.

13. The system of claim 12, wherein:
the document corresponds to a network-based locator;
the request includes the network-based locator; and
the document module is configured to generate the document based on the information resultant from the execution of the first task.

14. The system of claim 12, wherein:
the document module is configured to provide the portion of the document to the user after the execution of the first task and during the execution of the second task; and
a further portion of the document is definable by further information resultant from the execution of the second task.

15. The system of claim 11, wherein:
the schedule module is configured to schedule an execution of a fourth task of the plurality of tasks, the execution of the fourth task being scheduled as contemporaneous with the execution of the first task.

16. A non-transitory machine-readable storage medium comprising instructions that, when executed by one or more processors of a machine, cause the machine to perform operations comprising:
identifying a plurality of tasks as being prescribed for execution, the plurality of tasks including a first task, a second task, and a third task:
accessing task dependency data of the second task, the task dependency data indicating that the first task is to he executed prior to the second task;
generating first dependency model data of the plurality of tasks based on the task dependency data, the first dependency model data indicating that the first task is to be executed prior to the second task and that the third task is to be executed after the second task;
scheduling an execution of the first task by a data processing resource based on the first dependency model data, the first task being scheduled for execution by the data processing resource prior to an execution of the second task;
generating second dependency model data to indicate that fail the execution sequence of the second task and the third task has changed based on the result of the execution of the first task; and
scheduling an execution of the third task using a data processing resource based on the second dependency model data, the third task being scheduled for execution using the data processing resource prior to the execution of the second task.

17. The non-transitory machine-readable storage medium of claim 16, wherein:
the method further comprises:
obtaining information resultant from the execution of the first task;
generating a portion, of a document based on the information resultant from the execution of the first task; and
providing the portion of the document in response to a request that identifies a uniform resource locator (URL) of the document.

18. The non-transitory machine-readable storage medium of claim 16, wherein:
the first task is defined by a data structure and includes an instruction to perform at least one of a retrieval of data from a database or a conversion of the data.

19. The non-transitory machine-readable storage medium of claim 16, wherein:
the second task is defined by a data structure that includes the task dependency data.

20. A system comprising;
means for identifying a plurality of tasks as being marked for execution, the plurality of tasks including a first task, a second task, and a third task;
means for accessing task dependency data of the second task, the task dependency data indicating that the first task is to be executed prior to the second task;
means for generating first dependency model data of the plurality of tasks based on the task dependency data, the first dependency model data indicating that the first task is to be executed prior to the second task and that the third task is to be executed after the second task;
means for scheduling an execution of the first task using a data processing resource based on the first dependency model data, the first task being scheduled for execution using the data processing resource prior to an execution of the second task;
means for executing the first task using the data processing resource;
means for generating second dependency model data to indicate that the execution sequence of the second task and the third task has changed based on the result of the execution of the first task; and
means for scheduling an execution of the third task using a data processing resource based on the second dependency model data, the third task being scheduled for execution using the data processing resource prior to the execution of the second task.

* * * * *

UNITED STATES PATENT AND TRADEMARK OFFICE
CERTIFICATE OF CORRECTION

PATENT NO. : 8,887,163 B2  
APPLICATION NO. : 13/166395  
DATED : November 11, 2014  
INVENTOR(S) : Perv Rastogi Page 1 of 1

It is certified that error appears in the above-identified patent and that said Letters Patent is hereby corrected as shown below:

In the Claims

Column 17, line 9, in Claim 1, delete "comprising;" and insert --comprising:--, therefor Column 17, line 19, in Claim 1, after "that", delete ",", therefor Column 17, line 22, in Claim 1, delete "machine:" and insert --machine;--, therefor Column 18, line 16, in Claim 8, delete "tasks:" and insert --tasks;--, therefor Column 18, line 19, in Claim 8, delete "he" and insert --be--, therefor Column 18, line 40, in Claim 11, delete "he" and insert --be--, therefor Column 19, line 29, in Claim 16, delete "tasks:" and insert --tasks;--, therefor Column 19, line 31, in Claim 16, delete "he" and insert --be--, therefor Column 19, line 44, in Claim 16, before "the", delete "fail", therefor Column 20, line 6, in Claim 17, after "portion", delete ",", therefor Signed and Sealed this  
Third Day of March, 2015

Michelle K. Lee  
*Deputy Director of the United States Patent and Trademark Office*